(12) United States Patent
Sakai et al.

(10) Patent No.: US 9,028,984 B2
(45) Date of Patent: May 12, 2015

(54) PERPENDICULAR MAGNETIC RECORDING MEDIUM

(75) Inventors: Yasushi Sakai, Nagano (JP); Shunji Takenoiri, Yamanashi (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 1068 days.

(21) Appl. No.: 12/595,805

(22) PCT Filed: Apr. 11, 2008

(86) PCT No.: PCT/JP2008/057141
§ 371 (c)(1),
(2), (4) Date: Aug. 5, 2010

(87) PCT Pub. No.: WO2008/133035
PCT Pub. Date: Nov. 6, 2008

(65) Prior Publication Data
US 2010/0297476 A1 Nov. 25, 2010

(30) Foreign Application Priority Data
Apr. 13, 2007 (JP) ................................ 2007-106194

(51) Int. Cl.
*G11B 5/667* (2006.01)
*G11B 5/64* (2006.01)
(Continued)

(52) U.S. Cl.
CPC ................ *G11B 5/667* (2013.01); *G11B 5/647* (2013.01); *G11B 5/65* (2013.01); *G11B 5/7325* (2013.01)

(58) Field of Classification Search
None
See application file for complete search history.

(56) References Cited

U.S. PATENT DOCUMENTS 6,317,280 B1 * 11/2001 Nakajima et al. ............... 360/59
6,781,798 B2 * 8/2004 Gill .............................. 360/314
(Continued)

FOREIGN PATENT DOCUMENTS

JP 2002-208129 A 7/2002
JP 2002-358617 A 12/2002
(Continued)

OTHER PUBLICATIONS

Soichi Oikawa et al., "High performance CoPtCrO single layered perpendicular media with no recording demagnetization", IEEE transactions on magnetics, Sep. 2000, vol. 36, No. 5, pp. 2393-2395.

*Primary Examiner* — Kevin Bernatz
(74) *Attorney, Agent, or Firm* — Rabin & Berdo, P.C.

(57) ABSTRACT

A perpendicular magnetic recording medium includes a nonmagnetic substrate, and a soft magnetic layer, a first orientation control layer, a second orientation control layer, a nonmagnetic intermediate layer, a magnetic recording layer, and a protective layer layered sequentially on the nonmagnetic substrate. The first orientation control layer includes a thin film having a face-centered cubic (fcc) structure. The magnetic recording layer includes a thin film layer having ferromagnetic crystal grains and nonmagnetic grain boundaries surrounding the ferromagnetic crystal grains, the ferromagnetic crystal grains including a CoPt alloy having ferromagnetic properties, and the nonmagnetic grain boundaries including an oxide or a nitride. The nonmagnetic intermediate layer includes a thin film containing Ru. The second orientation control layer includes an alloy thin film having an element selected from among Ni and Fe and having the fcc structure, the second orientation control layer having a saturation magnetic flux density Bs of 1 T or lower.

5 Claims, 1 Drawing Sheet

(51) Int. Cl.
*G11B 5/65* (2006.01)
*G11B 5/73* (2006.01)

(56) References Cited

U.S. PATENT DOCUMENTS

| | | | |
|---|---|---|---|
| 6,818,330 B2 * | 11/2004 | Shukh et al. | 428/828 |
| 7,067,206 B2 | 6/2006 | Uwazumi et al. | |
| 7,083,870 B2 * | 8/2006 | Shimizu et al. | 428/828 |
| 7,211,340 B2 * | 5/2007 | Nolan | 428/831.2 |
| 7,247,396 B2 * | 7/2007 | Nolan et al. | 428/831.2 |
| 7,592,080 B2 * | 9/2009 | Takenoiri et al. | 428/828.1 |
| 7,611,783 B2 * | 11/2009 | Inamura et al. | 428/827 |
| 7,632,580 B2 * | 12/2009 | Ikeda et al. | 428/832.3 |
| 7,875,373 B2 * | 1/2011 | Hirayama et al. | 428/836.2 |
| 7,923,134 B2 * | 4/2011 | Ichihara et al. | 428/828 |
| 7,993,765 B2 * | 8/2011 | Kim et al. | 428/829 |
| 2002/0182446 A1 | 12/2002 | Takenoiri et al. | |
| 2003/0215675 A1 | 11/2003 | Inaba et al. | |
| 2004/0000374 A1 * | 1/2004 | Watanabe et al. | 156/278 |
| 2004/0033390 A1 * | 2/2004 | Oikawa et al. | 428/694 MM |
| 2004/0224185 A1 * | 11/2004 | Nakamura et al. | 428/694 TS |
| 2005/0019608 A1 * | 1/2005 | Kim et al. | 428/694 BS |
| 2006/0057430 A1 * | 3/2006 | Kuboki | 428/836.2 |
| 2006/0093867 A1 * | 5/2006 | Takenoiri et al. | 428/831.2 |
| 2006/0147760 A1 * | 7/2006 | Uwazumi et al. | 428/831.2 |
| 2006/0154113 A1 * | 7/2006 | Watanabe et al. | 428/836.2 |
| 2006/0199043 A1 * | 9/2006 | Sugimoto et al. | 428/828.1 |
| 2006/0222901 A1 * | 10/2006 | Inamura et al. | 428/827 |
| 2006/0291100 A1 * | 12/2006 | Lu et al. | 360/135 |
| 2007/0009654 A1 * | 1/2007 | Watanabe et al. | 427/126.3 |
| 2007/0082414 A1 * | 4/2007 | Watanabe et al. | 438/3 |
| 2007/0111035 A1 * | 5/2007 | Shimizu et al. | 428/828.1 |
| 2008/0080093 A1 * | 4/2008 | Inamura et al. | 360/125.73 |
| 2008/0096055 A1 * | 4/2008 | Takenoiri et al. | 428/831 |
| 2008/0213629 A1 * | 9/2008 | Bian et al. | 428/831 |
| 2010/0035085 A1 * | 2/2010 | Jung et al. | 428/800 |

FOREIGN PATENT DOCUMENTS

| | | | |
|---|---|---|---|
| JP | 2003-077122 A | | 3/2003 |
| JP | 2003077122 A | * | 3/2003 |
| JP | 2004-288348 A | | 10/2004 |
| JP | 2006-099951 A | | 4/2006 |
| JP | 2006099951 A | * | 4/2006 |
| JP | 2008-034060 A | | 2/2008 |
| JP | 2008034060 A | * | 2/2008 |
| WO | WO-2005/088609 A1 | | 9/2005 |
| WO | WO 2005088609 A1 | * | 9/2005 |

* cited by examiner

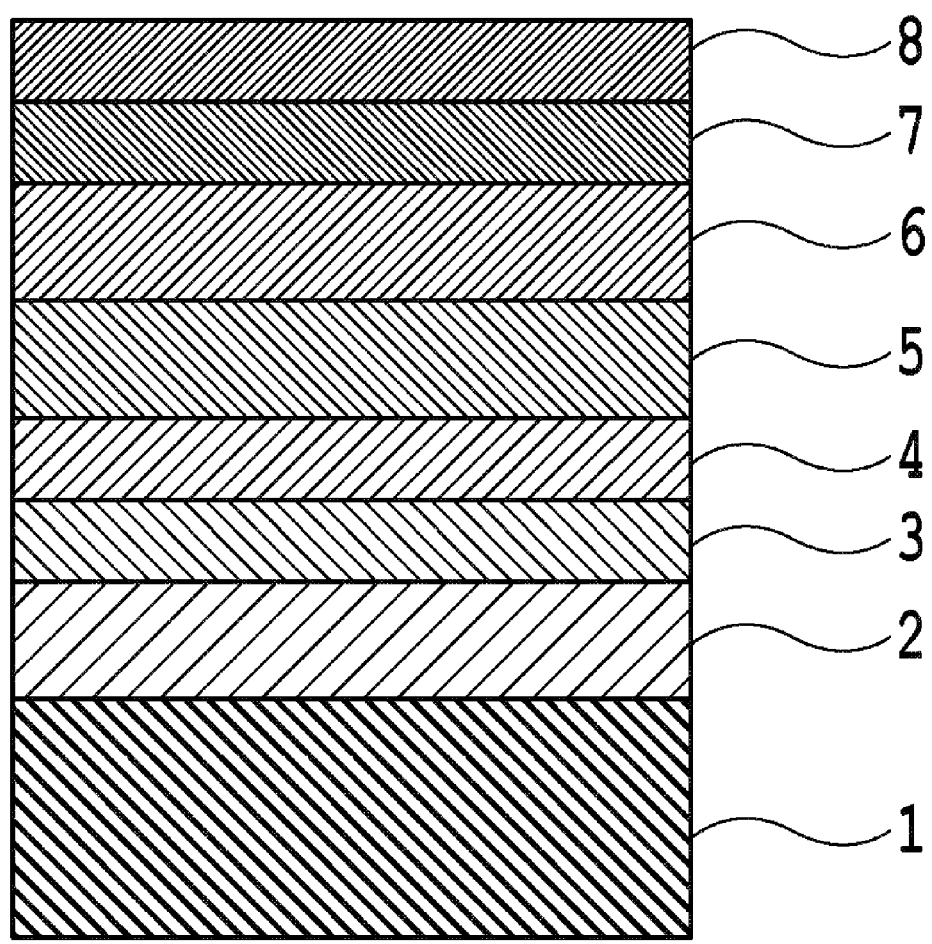

PERPENDICULAR MAGNETIC RECORDING MEDIUM

BACKGROUND OF THE INVENTION

1. Field of the Invention

This invention relates to a perpendicular magnetic recording medium, which is mountable in an external storage device for a computer or in other magnetic recording devices.

2. Description of the Related Art

Perpendicular magnetic recording methods are beginning to be commercialized as technology to achieve high densities in magnetic recording, in place of conventional longitudinal magnetic recording methods.

A perpendicular magnetic recording medium is generally formed by sequentially layering a soft magnetic backing layer, a nonmagnetic intermediate layer, a magnetic recording layer, and a protective layer. As the nonmagnetic intermediate layer, Ru or an alloy containing Ru is used. As the magnetic recording layer, materials having a so-called granular structure, which includes ferromagnetic crystal grains mainly comprising CoPt alloy having ferromagnetic properties and nonmagnetic grain boundaries mainly comprising an oxide and surrounding the ferromagnetic crystal grains, are widely used.

For example, a perpendicular recording medium, having a nonmagnetic intermediate layer of Ru and a magnetic recording layer of CoPtCr—O alloy with the so-called granular structure, is described in Oikawa et al., "High Performance CoPtCrO Single Layered Perpendicular Media with No Recording Demagnetization", IEEE Transactions on Magnetics, Vol. 36, No. 5, p. 2393-2395, September 2000. Here, as the film thickness of the Ru, which is the nonmagnetic intermediate layer, is increased, the c-axis orientation of the CoPtCr—O alloy in the magnetic recording layer is improved, isolation of magnetic crystal grains is promoted, and as a result, excellent magnetic characteristics and electromagnetic transducing characteristics are obtained.

Further, in the Specification of U.S. Pat. No. 7,067,206, a perpendicular magnetic recording medium is disclosed having, in order, a soft magnetic backing layer, an orientation control layer comprising an alloy with a face-centered cubic (fcc) structure, a nonmagnetic intermediate layer of Ru having a hexagonal close-packed (hcp) structure, and a magnetic recording layer of a CoPtCr—SiO$_2$ alloy having a granular structure. Here, by providing an orientation control layer, further control of the fine structure in the nonmagnetic intermediate layer and magnetic recording layer is possible, so that even more satisfactory electromagnetic transducing characteristics can be realized.

In Japanese Patent Application Laid-open No. 2004-288348, a perpendicular magnetic recording medium is disclosed in which an underlayer comprising soft magnetic Permalloy material and a soft magnetic Co layer or a soft magnetic Co-base alloy layer are provided between a soft magnetic backing layer and a nonmagnetic intermediate layer comprising Ru or Ru-base alloy. Here, by providing a soft magnetic Co layer or a soft magnetic Co-base alloy layer, the coercivity of the magnetic recording layer is increased, the squareness ratio of the medium is improved, and simultaneously the thickness of the Ru or Ru alloy film serving as the nonmagnetic intermediate layer can be reduced. As a result, media noise is decreased and the SNR (signal-to-noise ratio) is improved.

In order to further raise the recording density of a perpendicular magnetic recording medium, reduction of the thickness of the intermediate layer between the soft magnetic layer and the magnetic recording layer is extremely important; but a dilemma results in that there is also a need for the intermediate layer to be at least of a certain thickness in order to promote magnetic isolation of magnetic crystal grains in the magnetic recording layer and to improve crystal orientation. Further, if the intermediate film thickness is decreased in order to raise densities, there is a corresponding increase in noise arising in the soft magnetic layer, so that characteristics are degraded.

SUMMARY OF THE INVENTION

This invention was devised in light of the above problems, and has as an object of providing a perpendicular magnetic recording medium enabling a reduction in noise and still having high recording densities.

In order to attain the above object, a perpendicular magnetic recording medium of this invention is characterized in that it is formed by sequentially layering on a nonmagnetic substrate at least a soft magnetic layer, a first orientation control layer, a second orientation control layer, a nonmagnetic intermediate layer, a magnetic recording layer, and a protective layer; the first orientation control layer comprises a thin film having a face-centered cubic (fcc) structure; the magnetic recording layer has at least one thin film layer having ferromagnetic crystal grains mainly comprising a CoPt alloy having ferromagnetic properties, and nonmagnetic grain boundaries mainly comprising an oxide and surrounding the ferromagnetic crystal grains; the nonmagnetic intermediate layer comprises a thin film containing Ru or an Ru alloy; and the second orientation control layer comprises an alloy thin film at least comprising one or a plurality of elements selected from among Ni and Fe and having the fcc structure, and has a saturation magnetic flux density Bs of 1 T or lower, and preferably 0.5 T or lower.

Here, it is preferable that the second orientation control layer includes a thin film further containing one or a plurality of elements selected from among Cr, Mn and W. Also, it is preferable that the second orientation control layer comprises an alloy thin film further containing Co.

According to this invention, a second orientation control layer comprises an alloy thin film containing at least one element selected from among Ni and Fe and having the fcc structure, and moreover having a saturation magnetic flux density Bs of 1 T or lower, preferably 0.5 T or lower, and consequently a perpendicular magnetic recording medium having satisfactory SNR characteristics can be fabricated.

Further, by adding one or a plurality of elements selected from among Cr, Mn and W to the second orientation control layer, a perpendicular magnetic recording medium having even better characteristics can be fabricated. And, by adding Co to the second orientation control layer, a perpendicular magnetic recording medium having even better characteristics can be fabricated.

BRIEF DESCRIPTION OF THE DRAWINGS

FIG. 1 is a schematic cross-sectional diagram showing the configuration of an aspect of a perpendicular magnetic recording medium of this invention.

DETAILED DESCRIPTION OF THE INVENTION

Below, a preferred aspect of the invention is explained in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

FIG. 1 is a schematic cross-sectional diagram showing the configuration of an aspect of a perpendicular magnetic recording medium of this invention. As shown in FIG. 1, a perpendicular magnetic recording medium of the aspect of the invention has a structure in which are sequentially formed on a nonmagnetic substrate 1, a soft magnetic layer 2, a first orientation control layer 3, a second orientation control layer 4, a nonmagnetic intermediate layer 5, a magnetic recording layer 6, and a protective layer 7; moreover, a liquid lubricant layer 8 is formed thereupon.

As the nonmagnetic substrate 1, Al alloy with NiP plating, or reinforced glass, crystallized glass, or another material used in normal magnetic recording media, can be used.

As the soft magnetic layer 2, an NiFe alloy, Sendust (FeSiAl) alloy, FeCo alloy, FeTa alloy, or similar can be used; for example, by using CoNbZr, CoTaZr, CoFeZrNb, CoFeTaZr, or another amorphous Co alloy, satisfactory electromagnetic transducing characteristics can be obtained. The optimum value of the thickness of the soft magnetic layer 2 varies with the structure and characteristics of the magnetic head used in recording, but from considerations of manufacturing productivity, a thickness of 10 nm or more and 200 nm or less is desirable.

The first orientation control layer 3 must be a metal or an alloy having the face-centered cubic (fcc) crystal structure. When a material such as an NiFe alloy having soft magnetic properties is used as the first orientation control layer 3, structure control of the nonmagnetic intermediate layer 5 is possible without widening the distance between the magnetic recording head and layers having soft magnetic properties, and so it is extremely preferable that the first orientation control layer 3 contains at least Ni and Fe and has soft magnetic properties.

The nonmagnetic intermediate layer 5 must be a metal or an alloy having the hexagonal close-packed (hcp) crystal structure; it is extremely desirable that the intermediate layer 5 be pure Ru or an alloy containing Ru.

The magnetic recording layer 6 is a so-called granular magnetic layer comprising CoCr alloy crystal grains having ferromagnetic properties and nonmagnetic grain boundaries surrounding the crystal grains, and in which the nonmagnetic grain boundaries comprise oxides or nitrides of metals. The granular magnetic layer can be fabricated by for example sputtering of a ferromagnetic metal target comprising oxides or nitrides forming the nonmagnetic grain boundaries, or by reactive sputtering of a ferromagnetic metal target in Ar gas containing nitrogen or oxygen. In order to obtain satisfactory characteristics for the granular magnetic layer, it is desirable that the gas pressure during film deposition be 10 mTorr or higher.

As the material forming crystal grains having ferromagnetic properties, a CoPtCr alloy can be used advantageously. Moreover, B, Ta, or similar may also be added as suitable. On the other hand, as the material forming the nonmagnetic grain boundaries, oxides or nitrides of Cr, Co, Si, Al, Ti, Ta, Hf, Zr, or similar elements can be used. In order to improve characteristics, the magnetic recording layer 6 may have a layered structure of two or more layers. In this case, as the material of the second and subsequent layers, a granular magnetic layer with composition different from the first layer, or, CoCrPt, CoCrPtTa, CoCrPtB, or another magnetic layer not containing oxides or nitrides, can be used. It is desirable that the thickness of the magnetic recording layer 6 be 5 nm or greater and 30 nm or less. By keeping the film thickness within this range, adequate characteristics as a magnetic recording layer as well as high recording/reproduction resolution are obtained.

As the protective layer 7, for example a thin film mainly comprising carbon is used.

As the liquid lubricant layer 8, for example a perfluoro polyether lubricant can be used.

Below, the second orientation control layer 4 is explained. The second orientation control layer 4 must be an alloy thin film at least comprising one or more elements selected from among Ni and Fe, and having the fcc structure. Further, in order to reduce noise in the magnetic recording medium and obtain excellent electromagnetic transducing characteristics, the second orientation control layer 4 must have a Bs of 1 T or lower, and preferable of 0.5 T or lower.

Further, by adding one or a plurality of elements selected from among Cr, Mn and W, and controlling the Bs of the second orientation control layer to be 1 T or lower, and preferably 0.5 T or lower, finer crystal grains are promoted, and a perpendicular magnetic recording medium having still better electromagnetic transducing characteristics can be fabricated. There are no limits in particular to the amount of the addition, so long as the second orientation control layer has the fcc structure, but when large amounts of Mn are added, the corrosion resistance is degraded, and so it is preferable that the Mn addition amount be 50% or less.

Further, it is preferable that the second orientation control layer 4 further contains Co.

EMBODIMENTS

Below, an embodiment of the invention, in which the above-described aspect is made more specific, is explained.

Embodiment 1

As the nonmagnetic substrate 1, an Al substrate plated with NiP was used; this was placed within a sputtering device after cleaning. A $Co_{87}Zr_5Nb_8$ target was used in Ar gas at a pressure of 5 mTorr (approximately 0.67 Pa) to form the soft magnetic layer 2, of thickness 100 nm, comprising a CoZrNb amorphous alloy. Then, an $Ni_{83}Fe_{12}Cr_5$ target was used in Ar gas at a pressure of 10 mTorr (approximately 1.33 Pa) to form the first orientation control layer 3, of thickness 10 nm, comprising an NiFeCr soft magnetic alloy with the fcc structure. Next, a target with the composition shown in Table 1 was used in Ar gas at a pressure of 5 mTorr (approximately 0.67 Pa) to form the second orientation control layer 4, of thickness 10 nm.

Then, the nonmagnetic intermediate layer 5, comprising Ru and of thickness 15 nm, was formed in Ar gas at a pressure of 30 mTorr (approximately 4.00 Pa). Next, a $Co_{79}Cr_7Pt_{14}$ target with 12 mol % $SiO_2$ added was used to form a $CoCrPt—SiO_2$ granular magnetic layer, of thickness 10 nm, in Ar gas at a pressure of 30 mTorr (approximately 4.00 Pa), after which a $Co_{66}Cr_{20}Pt_{10}B_4$ target was used to form an alloy magnetic layer, of thickness 5 nm, in Ar gas at a pressure of 5 mTorr (approximately 0.67 Pa), to form a magnetic recording layer 6 with a two-layer layered structure. Then, after using the CVD method to form a protective layer 7 of thickness 5 nm, mainly comprising carbon, the layered member was removed from vacuum. Then a perfluoro polyether liquid lubricant was applied to form a liquid lubricant layer 8 of thickness 1.5 nm, to complete fabrication of the perpendicular magnetic recording medium the configuration of which is shown in FIG. 1.

The crystal structures of the second orientation control layer 4 and of each of the other layers were determined by X-ray diffraction, using as measurement samples the layered member before and after formation of the second orientation control layer and the other layers. The saturation magnetic flux density Bs of the second orientation control layer 4 was calculated using a VSM, using as the measurement sample a single-layer film formed on Al substrate with NiP plating. Electromagnetic transducing characteristics of the perpendicular magnetic recording medium were measured using a spinstand tester (manufactured by Guzik Technical Enterprises) and a shielded pole head for perpendicular recording with a write track width of 0.12 μm, comparing the SNR at a recording density of 700 kFCI. The results appear in Table 1.

When the second orientation control layer 4 does not contain either Ni or Fe, even if the second orientation control layer 4 has the fcc structure and a Bs of 0.5 T or lower, the SNR of the perpendicular magnetic recording medium has a low value of 10 dB or lower. And, even when the second orientation control layer 4 contains at least one element among Ni and Fe and has the fcc crystal structure, if the Bs is 1 T or greater, noise arising from the second orientation control layer is increased, so that a satisfactory SNR is not obtained. And, even when the second orientation control layer 4 has a Bs of 1 T or lower, if the crystal structure is not the fcc structure, satisfactory characteristics are not obtained.

It is seen that even when a second orientation control layer 4 is used which contains at least one element from among Ni and Fe and has the fcc structure, a low Bs value results in a satisfactory SNR. It is seen that in order to obtain a SNR of 10 dB or higher, it is desirable that the Bs be 1 T or lower, and when a still more satisfactory SNR is desired, the Bs should be 0.5 T or lower.

Hence, as the second orientation control layer 4, an alloy thin film must be used which at least contains one or a plurality of elements selected from among Ni and Fe, has the fcc structure, and also has a Bs of 1 T or lower, and preferably of 0.5 T or lower. It is seen that by adding one or a plurality of elements selected from among Cr, Mn and W to a second orientation control layer 4 containing at least one element from among Ni and Fe, a more satisfactory SNR is obtained than when Cr, Mn or W are not added. And, the lower the Bs of the second orientation control layer 4, the more the SNR is improved; when Cr or W is added until the Bs is approximately 0 T (that is, until the second orientation control layer 4 becomes nonmagnetic), a satisfactory SNR is obtained, and a still more satisfactory SNR is obtained when Co is also added.

It should be understood, that the invention is not necessarily limited to the specific process, arrangement, materials and components shown and described above, but may be susceptible to numerous variations within the scope of the invention.

TABLE 1

| | Composition of second orientation control layer | Target composition for second orientation control layer | Crystal structure of second orientation control layer | Bs (T) | SNR (dB) |
|---|---|---|---|---|---|
| Reference Example 1 | Cu | Cu | fcc | 0 | 7.3 |
| Reference Example 2 | FeCoN | $Fe_{55}Co_{35}N_{10}$ | fcc | 1.8 | 9.2 |
| Reference Example 3 | CoZrNb | $Co_{83}Zr_7Nb_{10}$ | amorphous | 0.9 | 8.7 |
| Reference Example 4 | FeAl | $Fe_{83}Al_{17}$ | bcc | 0.7 | 9.5 |
| Reference Example 5 | CoNb | $Co_{85}Nb_{15}$ | hcp | 0.95 | 10.7 |
| Embodiment 1-1 | NiFeSi | $Ni_{76}Fe_{20}Si_4$ | fcc | 0.7 | 10.9 |
| Embodiment 1-2 | NiW | $Ni_{98}W_2$ | fcc | 0.4 | 11.3 |
| Embodiment 1-3 | NiFeMn | $Ni_{70}Fe_{17}Mn_3$ | fcc | 0.6 | 11.5 |
| Embodiment 1-4 | CoNiFeCr | $Co_{42}Ni_{22}Fe_{11}Cr_{25}$ | fcc | 0 | 12.8 |
| Embodiment 1-5 | NiW | $Ni_{92}W_8$ | fcc | 0 | 12.2 |
| Embodiment 1-6 | NiCr | $Ni_{70}Cr_{30}$ | fcc | 0 | 12.4 |

The invention claimed is:

1. A perpendicular magnetic recording medium, comprising:
   a nonmagnetic substrate; and
   a soft magnetic layer, a first orientation control layer, a second orientation control layer, a nonmagnetic intermediate layer, a magnetic recording layer, and a protective layer, layered sequentially on the nonmagnetic substrate, wherein
   the first orientation control layer is formed directly on the soft magnetic layer,
   the first orientation control layer includes a thin film having an element selected from Ni and Fe and having a face-centered cubic (fcc) structure,
   the second orientation control layer is nonmagnetic and includes an alloy thin film having the fcc structure, the alloy thin film of the second orientation control layer including
   an element selected from Ni and Fe, and
   an element selected from Mn and W,
   the second orientation control layer being formed directly on the first orientation control layer,
   the nonmagnetic intermediate layer includes a thin film containing Ru, and
   the magnetic recording layer includes a thin film layer having ferromagnetic crystal grains and nonmagnetic grain boundaries surrounding the ferromagnetic crystal grains, the ferromagnetic crystal grains including a CoPt alloy having ferromagnetic properties, and the nonmagnetic grain boundaries including an oxide or a nitride.

2. The perpendicular magnetic recording medium of claim 1, wherein the thin film of the first orientation control layer is an alloy including Ni and Fe.

3. The perpendicular magnetic recording medium of claim 2, wherein the first orientation control layer has soft magnetic properties.

4. The perpendicular magnetic recording medium of claim 1, wherein the thin film of the nonmagnetic intermediate layer contains an Ru alloy.

5. A perpendicular magnetic recording medium, comprising:

a nonmagnetic substrate; and a soft magnetic layer, a first orientation control layer, a second orientation control layer, a nonmagnetic intermediate layer, a magnetic recording layer, and a protective layer, layered sequentially on the nonmagnetic substrate, wherein the first orientation control layer includes a thin film having an element selected from Ni and Fe and having a face-centered cubic (fcc) structure, the second orientation control layer is nonmagnetic and includes an alloy thin film having the fcc structure, the alloy thin film of the second orientation control layer including Co, an element selected from Ni and Fe, and an element selected from Mn and W, the second orientation control layer being formed directly on the first orientation control layer, the nonmagnetic intermediate layer includes a thin film containing Ru, and the magnetic recording layer includes a thin film layer having ferromagnetic crystal grains and nonmagnetic grain boundaries surrounding the ferromagnetic crystal grains, the ferromagnetic crystal grains including a CoPt alloy having ferromagnetic properties, and the nonmagnetic grain boundaries including an oxide or a nitride.

\* \* \* \* \*